United States Patent [19]

Werner

[11] 3,983,693

[45] Oct. 5, 1976

[54] DEVICE FOR STARTING ONE OF A PLURALITY OF AIRPLANE ENGINES

[75] Inventor: Reinhold Werner, Oberstedten, Germany

[73] Assignee: Klockner-Humboldt-Deutz Aktiengesellschaft, Cologne, Germany

[22] Filed: May 9, 1974

[21] Appl. No.: 468,480

[30] Foreign Application Priority Data
May 10, 1973  Germany............................ 2323549

[52] U.S. Cl..................................... 60/39.14; 74/6; 74/665 B; 123/179 AS
[51] Int. Cl.²............................................. F02C 7/26
[58] Field of Search...........74/665 B, 665 D, 665 F, 6; 123/179; 60/39.15, 39.14

[56] References Cited
UNITED STATES PATENTS

| | | |
|---|---|---|
| 3,098,626 | 7/1963 | Messinger............................ 60/39.14 |
| 3,290,963 | 12/1966 | Oldfield et al...................... 60/39.14 |
| 3,416,309 | 12/1968 | Elmes et al......................... 60/39.14 |
| 3,426,527 | 2/1969 | O'Connor........................... 60/39.14 |
| 3,465,162 | 9/1969 | Oprecht............................. 60/39.14 |
| 3,844,112 | 10/1974 | Harrison............................ 60/39.14 |

*Primary Examiner*—Samuel Scott
*Assistant Examiner*—Randall Heald
*Attorney, Agent, or Firm*—Walter Becker

[57] ABSTRACT

A device for starting one of a plurality of airplane engines with a starter by way of hydrodynamic transmission elements or a hydrodynamic torque converter having arranged in parallel therewith an overriding clutch that is connected to each engine. The engines are adapted to be coupled to each other by means of transmission gearing and coupling means arranged behind the hydrodynamic transmission elements when viewed from the engine side. The hydrodynamic transmission elements are adapted by variation of the filling to be controlled in such a way that the power intake beyond a predetermined speed will increase at a lower rate.

8 Claims, 3 Drawing Figures

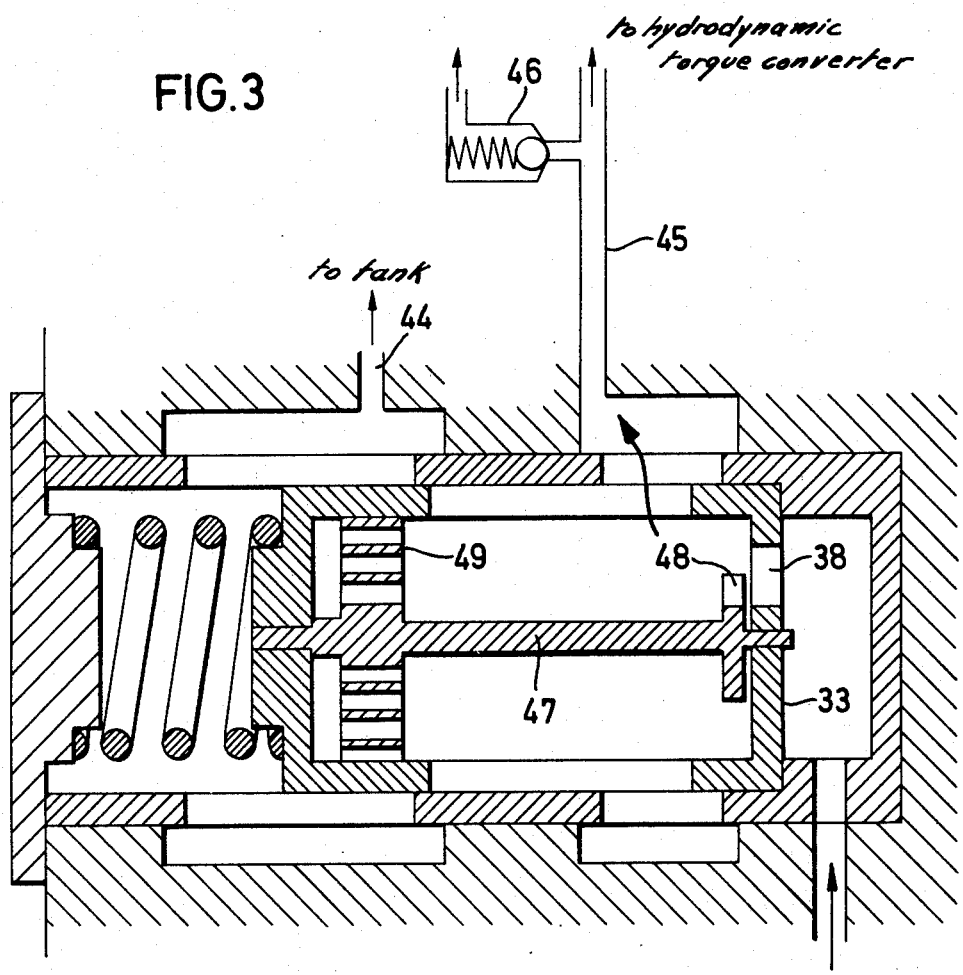

DEVICE FOR STARTING ONE OF A PLURALITY OF AIRPLANE ENGINES

The present invention relates to a device for starting one of several airplane engines with a starter which is connected to each engine by means of a parallel arranged overriding clutch and hydrodynamic relay or transmission elements such as a hydrodynamic clutch or a hydrodynamic converter. Seen from the side where the engines are located, the engines may be coupled together by means of transmission gears and clutches located behind the hydrodynamic transmission elements.

Such a device is known from German Offenlegungsschrift 1,928,234, according to which the engines are started with a starter unit which at the same time, during ground operations, serves to operate auxiliary aircraft devices such as generators, hydraulic pumps, and the like. However, during operation of the aircraft in the air, the main engines take over operation of the auxiliary aircraft devices. The starting of the engines by means of the starter, for example a board-attached auxiliary gas turbine, is initiated prior to take-off of the aircraft by priming or charging the transmission elements with oil. For this instance, the necessary starting power of the hydrodynamic transmission elements, which are correspondingly designed, are specified.

Following the failure of an engine in flight, for example extinguishment in the combustion chamber, it must be possible to restart the engine with the aid of the hydrodynamic transmission elements. In this case the hydrodynamic transmission elements are operated by the engines which are still functioning. In this regard, the input speed of the hydrodynamic transmission elements can be considerably greater than the speed occurring during start up on the ground. Pursuant to the principles applicable to fluid flow or jet engines, the power input required for a 75% increase in speed rises by a multiple of five. The high driving power requirements are undesirable because of the high load, the intense heating up of the oil, and the detrimental effects upon the actuated engine.

It is an object of the present invention to avoid the drawbacks outlined above in a simple manner.

This object and other objects and advantages of the present invention will appear more clearly from the following specification in connection with the accompanying drawings, in which:

FIG. 3 is a longitudinal section through a modified version of the control valve shown in FIG. 2.

Figure 1:
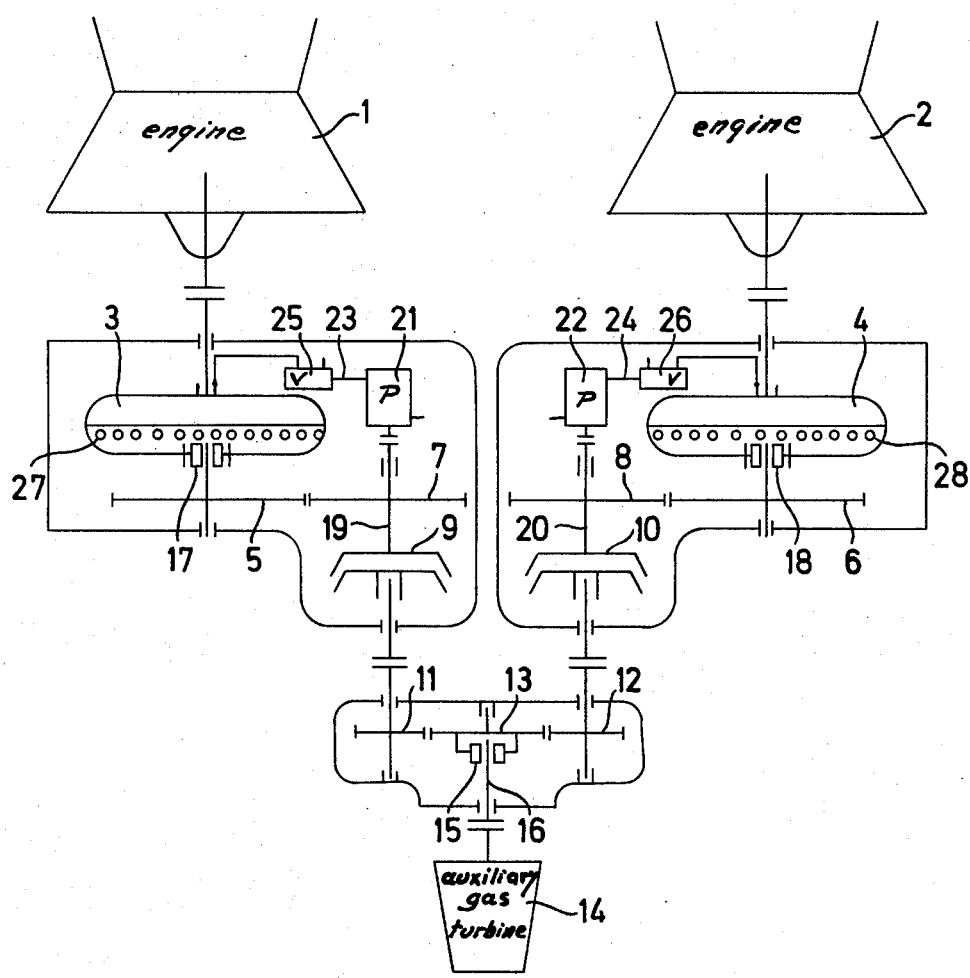
FIG. 1 shows a schematic arrangement of the device according to the present invention.

The device according to the present invention is characterized primarily in that the hydrodynamic transmission elements by alteration or modification of the filling, are controllable or adjustable in such a way that the power intake required beyond a predetermined speed increases only minimally.

Devices for altering the priming or charging of flow-through hydraulic couplings for motor vehicles are known from German Patent 835,839. The known device reduces the transferable moment in the presence of great slippage during start-up, and increases the moment when there is little slippage and higher speed. This is achieved by controlling the feed line of a priming pump by a control valve which has an axially movable piston which is spring loaded at one end face and is acted upon at the other end face by the pressure medium from an auxiliary speed measuring pump.

With the arrangement according to the present invention on the other hand, the power requirement of the hydrodynamic transmission elements remains in the range of tolerable values during high speeds while in flight. This is possible because only a small output power increase above a predetermined speed is allowed, or the control is so designed, that the power required beyond a predetermined speed remains constant or decreases.

The proposed control may be advantageously realized by having one of the rotary or positive-displacement pumps, which is powered by the engines or the starter, serve as priming pump for the hydrodynamic transmission elements. The control is further realized by conveying the working medium through a control valve to the hydrodynamic transmission elements. The control valve comprises a spring loaded distributing slide valve servo-piston which is axially movable in a control cylinder. One end face of the piston is acted upon by the working medium against the spring force and, through a restrictor and guidance vent, is connected to the hydrodymanic transmission elements by a supply conduit or to the tank by a return conduit. The positive-displacement pump, which is powered by the engines or the starter, generates a speed dependent volume stream which flows through the control valve to the hydrodynamic transmission elements. The resistance at the restrictor is increased with increased speed and volume stream until the distributing slide valve servo-piston is displaced axially against the spring force to such an extent that the guidance vents activate or open a return pipe and a portion of the volume stream is returned to the tank. While the above is occurring, the servo-piston is partially covering the supply conduit, so that only a portion is supplied to the hydrodynamic transmission elements. By successively coordinating the spring and the restrictor and by positioning the guidance vents to each other, the speed can be predetermined, according to which a guiding away of the volume stream is initiated. In addition, pursuant to the above, the amount or volume guided away is variable. The priming or charging of the hydrodynamic transmission elements results from the difference in the amount supplied to the transmission elements and the amount flowing off for cooling purposes.

In order to compensate or correct for the temperature dependent viscosity effect of the working medium, for example the oil, according to a further development of the present invention, the flow-through cross section of the restrictor increases with decreasing temperature. This is accomplished simply in that a rotary slide valve is mounted in a hollow distributing slide valve servo-piston. The rotary slide valve is regulated by a bimetal spring and overlaps the restrictor to a greater or lesser degree.

Referring now to the drawing in detail, the arrangement shown in FIG. 1 comprises two airplane engines 1 and 2 which are connected to an auxiliary gas turbine 14 by means of hydrodynamic converters 3 and 4, gearing 5 to 8, couplings 9 and 10, and gearing 11 to 13. The gearing 13 is connected to the shaft 16 by means of an overriding clutch 15 in order to protect the auxiliary gas turbine against excess speed or revolutions per minute during start up or operation by means of the engines 1 and 2. For transmission purposes further overriding clutches 17 and 18 are arranged parallel to the hydrodynamic converters 3 and 4, which they later bridge when the drive is effected from the engines.

Displacement-type priming pumps 21 and 22 are coupled to the shafts 19 and 20 upon which the gearing 7 and 8 are mounted. These pumps 21 and 22 convey working medium, for example hydraulic oil, to the hydrodynamic converters 3 and 4 through supply conduits 23 and 24 and regulating or control valves 25 and 26. The priming pumps 21 and 22 are operated by the illustrated power elements either by the auxiliary gas turbine 14 or by the engines 1 or 2 and deliver accordingly a volume stream dependent upon the speed or revolutions per minute. The housings for the hydrodynamic converters 3 and 4 have bores 27 and 28, through which the working medium returns to the tank. The filling of the hydrodynamic converters 3 and 4 is determined by the difference in the amounts of supplied and drawn off working medium. The amount supplied is determined by the regulating valves 25 and 26.

Figure 2:
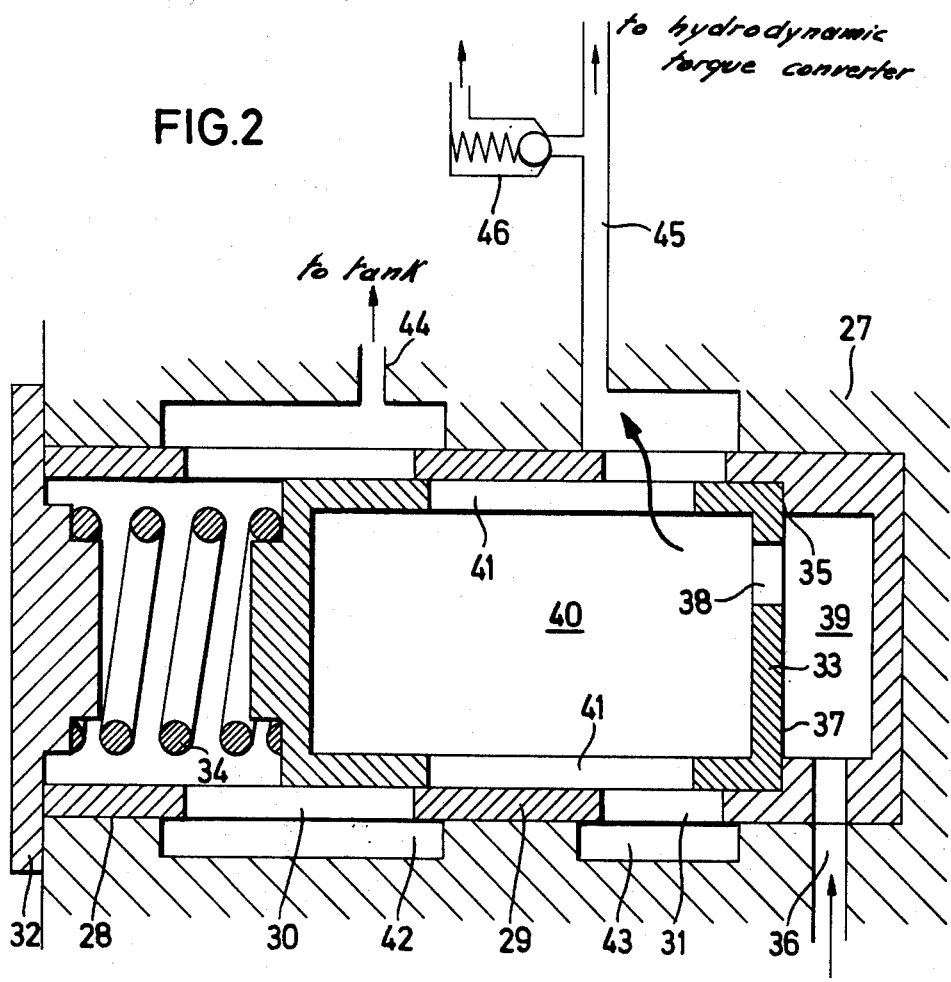
FIG. 2 illustrates on an enlarged scale a longitudinal section of a control valve used in the device according to the present invention as shown in FIG. 1.

FIG. 2 shows in detail the design of the regulating valves 25 and 26 of the same construction. A sleeve 29b is located in a bore 29a provided in a housing 29. The sleeve 29b has ports or openings 30 and 31 at its periphery and, together with the bore 29a, is closed by means of a lid 32. An axially displaceable, hollow, distributing slide valve servo-piston 33 is guided in the sleeve 29b. The piston 33 rests against the lid 32 by means of a spring 34 and abuts a surface 35 of the sleeve 29b. The working medium is supplied to the control valves 25 and 26 by the filling pumps 21 and 22 through a conduit 36, where it acts upon that end face 37 of the servo-piston 33 which faces away from the spring 34. A restrictor in the form of a choke bore 38, is provided in the end face 37. This choke bore 38 connects the housing chamber 39 which is in front of the piston 33 with the interior 40 of the hollow piston 33. Guidance vents or control slots 41 are arranged on the periphery of the piston 33 and work in cooperation with the control openings 30 and 31 which lead to annular chambers 42 and 43 to which are connected return conduits 44 which lead to a tank (not shown) or to the return conduit 25 which leads to the hydrodynamic converters 3 and 4. A check-valve 46 is provided on the feeding conduit 45.

The control valves operate in the following manner: the working medium, which is supplied by the filling pumps 21, 22 in a speed dependent volume stream, flows through the conduit 36 into the chamber 39 where it acts upon the end face 37 of the distributing slide valve servo-piston 33. From there the medium flows through the choke bore 38, the control slots 41, the ports 31, the annular chamber 43, and the return conduit 45 to the hydrodynamic converters 3, 4. FIG. 2 shows the normal position of the piston 33. The drop in pressure at the choke bore 38 increases when the volume stream increases, thereby causing the piston 33 to be pushed to the left against the spring force. The size of the choke bore 38 and the force of the spring 34 allow for determination of the speed at which the piston 33 is moved towards the left.

The displacement of the distributing slide valve servo-piston 33 reduces the cross section of the passages or ports 31, while the ports 30 come into communication with the control slots 41, allowing a portion of the volume stream to flow through the ports 30, the annular chamber 42, and the return conduit 42 to a tank (not illustrated). The supplied amount of working medium is adjusted relative to the amount of working medium withdrawn from the hydrodynamic converters in such a way that, starting with a specific predetermined speed, in accordance with requirements, the power intake required by the hydrodynamic converters increases more slowly, remains constant, or decreases.

The embodiment of FIG. 3 differs from that of FIG. 2 in that a rotary slide valve 47 is mounted in the hollow distributing slide valve servo-piston 33. The rotary slide valve 47 has a slot 48 and is connected to a helical bimetal spring 49 which rotates the slide valve 47 in conformity with the temperature in such a way that the choke bore 38 is in more or less communications with the slot 48. It is necessary at low temperatures and with high viscosity working mediums that the throttle bore 38 be opened wider than at higher temperatures in order to correct for the effect of the viscosity on the power or output of the hydrodynamic transmission elements.

It is, of course, to be understood that the present invention is, by no means, limited to the specific showing of the drawings but also comprises any modifications within the scope of the appended claims.

What I claim is:

1. A device for starting one of a plurality of airplane engines that must become started during operation of several engines already started for normal running operation, which includes: starter means, hydrodynamic transmission means operatively connected to said starter means and connectable to each of the engines to be started, coupling means associated with said hydrodynamic transmission means for coupling the engines to be started to each other prior to starting, and control means associated with said hydrodynamic transmission means and operable after starting of engines to control the supply of actuating fluid to said hydrodynamic transmission means so as to cause the power input thereof from a predetermined speed on to adopt a predetermined behavior for starting an engine that became eliminated from normal running operation.

2. A device for starting one of a plurality of airplane engines, which includes: starter means, hydrodynamic transmission means operatively connected to said starter means and connectable to each of the engines to be started, coupling means associated with said hydrodynamic transmission means for coupling the engines to be started to each other, control means associated with said hydrodynamic transmission means and operable to control the supply of actuating fluid to said hydrodynamic transmission so as to cause the power input thereof from a predetermined speed on to adopt a predetermined behavior, control valve means associated with said hydrodynamic transmission means, and displacement pump means communicating with said valve means for conveying filling fluid through said control valve means to said hydrodynamic transmission means.

3. A device according to claim 2, in which said control means are operable to control the supply of actuating fluid to said hydrodynamic transmission means so as to cause the power input thereof from a predetermined speed on to increase at a lower rate.

4. A device according to claim 2, in which said control means are operable to control the supply of actuating fluid to said hydrodynamic transmission means so as to cause the power input thereof from a predetermined speed on to remain constant.

5. A device according to claim 2, in which said control means are operable to control the supply of actuating fluid to said hydrodynamic transmission means so as to cause the power input thereof from a predetermined speed on to decrease.

6. A device according to claim 2, in which said control valve means includes cylinder means closed at both ends, hollow valve spool means reciprocable in said cylinder means, abutment means arranged in said cylinder means in spaced relationship to one end of said cylinder means for limiting movement of said valve spool means toward said last mentioned one end, preloaded spring means interposed between the other end of said cylinder means and said spool means and continuously urging the same toward said abutment means, said first mentioned one end of said cylinder means defining with the adjacent endwall of said spool means a control chamber, and said last mentioned endwall having a throttle bore therethrough establishing communicating between said control chamber and the interior of said valve spool means, first conduit means leading into said control chamber for conveying actuating fluid for said hydrodynamic means into said control chamber, said valve spool means and said cylinder means having peripheral control slot means for variable communication with each other in conformity with the position of said valve spool means relative to said cylinder means, and second and third conduit means respectively communicating with said peripheral slot means of said cylinder means for respectively conveying fluid to said hydrodynamic transmission means and a reservoir.

7. A device according to claim 6, which includes temperature sensitive means adjacent to and for cooperation with said throttle bore for increasing the free cross section of said throttle bore in response to a decreasing temperature.

8. A device according to claim 7, in which said temperature sensitive means includes a rotary valve member and bimetal spring means associated with said rotary valve member for controlling said rotary valve member so as to vary the free cross section of said throttle bore.

* * * * *